Figure 1:
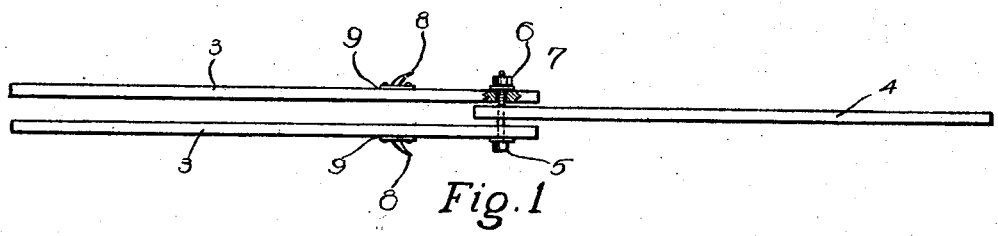

May 15, 1928.  
F. F. FETTER  
1,670,029  
GAMBREL HOOK AND HOISTING APPLIANCE  
Filed May 31, 1927

INVENTOR.  
Frank F. Fetter  
BY Chas. W. Gerard  
his ATTORNEY.

Patented May 15, 1928.

1,670,029

UNITED STATES PATENT OFFICE.

FRANK F. FETTER, OF BUCKLIN, KANSAS.

GAMBREL HOOK AND HOISTING APPLIANCE.

Application filed May 31, 1927. Serial No. 195,205.

The present invention relates to butchering devices, and aims to provide a novel and improved gambrel hook and hoisting appliance, whereby the operation of suspending and handling the carcass of an animal may be conveniently and efficiently carried out.

Accordingly, the principal object of the invention is to devise a simple and inexpensive appliance of this character which includes separately mounted gambrel hooks carried by a hoisting appliance which may be operated to conveniently elevate the carcass and at the same time spread the hooks to any required extent for facilitating the work of dressing or cutting the carcass.

Incidentally, the independent mounting of the gambrel hooks is such as to allow each one to continue its supporting function of carrying a portion of the carcass regardless of this being completely severed for the removal of the load from one of the hooks.

It is also sought to provide an improved construction of this type which will enable it to be shifted around to any degree necessary for facilitating the work on the carcass, and also make it practical for one man to do all the work, both in shifting the apparatus or adjusting it in the raising or lowering of the carcass in addition to the work of dressing, skinning or cutting the same.

With these general objects in view, the invention will now be described by reference to the accompanying drawing illustrating one practical form of embodiment of my invention, after which those features deemed to be novel will be particularly set forth and defined in the appended claims.

In the drawing—

Figure 2:
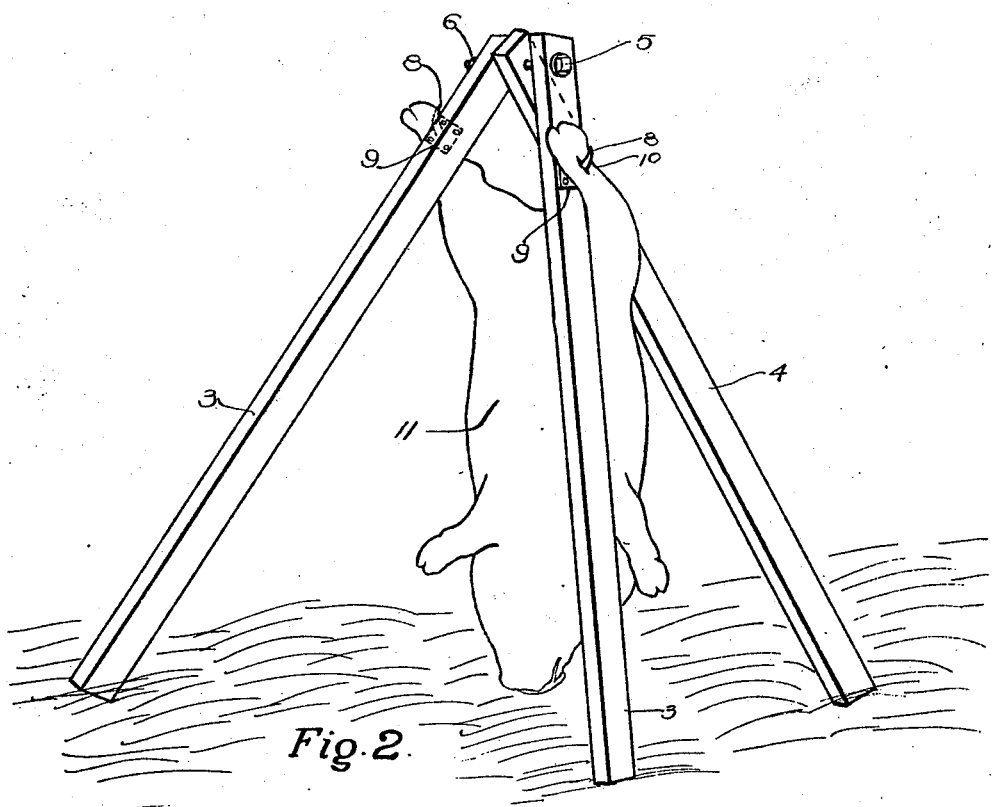

Figure 1 is a plan view of the apparatus in completely lowered or collapsed position before hooking the animal carcass thereon; and Figure 2 is perspective view of the apparatus on an enlarged scale and showing it in operative position for supporting a carcass.

Referring now to the said drawing in detail, this illustrates the improved apparatus as comprising a set of three supporting and hoisting legs, namely, a pair of outer legs 3 pivotally connected at their upper ends to an intermediate leg 4, the pivotal connection being made by means of a suitable bolt 5 provided with a nut 6, said bolt extending through openings 7 in the legs, and the openings in the outer legs 3 being somewhat larger than the bolt to permit a certain amount of outward spreading movement of the legs 3—as illustrated in Figure 2.

Near their upper ends the supporting legs 3 are each provided with a gambrel hook 8 carried by a suitable bracket plate 9 securely fastened as indicated to the outer face of the corresponding leg 3, with the hook 8 extending in upwardly and outwardly projecting relation.

The position of use of the apparatus is clearly illustrated in Figure 2. For loading the hooks 8 the supporting legs are extended in opposite directions as indicated in Figure 1 for locating them over the carcass which is usually on the ground or low table or platform; the gambrels 10 of the carcass 11 are then engaged with the hooks 8. Now by manipulating the lower end portion of the supporting leg 4 for the purpose of pushing or prying it in the direction of the legs 3, the operator may thus hoist the carcass to any desired extent, and at the same time swing the apparatus around and away from the table or platform, into position for skinning or dressing and cutting up the carcass.

For this latter operation it is desirable to spread apart the hind quarters of the carcass as shown in Figure 2, for which purpose the loose pivotal connection between the upper ends of the legs 3 and the bolt 5 by virtue of the enlarged openings 7 permits an outward spreading of said legs sufficient for opening up or spreading said hind quarters their fullest extent. This exposes the carcass to free access all round and facilitates the work of the butcher in the operations of dressing and cutting,—which is not the case with the usual gambrel hoist where either the carcass is not spread out sufficiently to afford perfectly free access or the supporting legs or other parts of the supporting apparatus are usually more or less in the way of the operator.

An outstanding feature of advantage in my improved apparatus is the independent mounting of the gambrel hooks whereby, on splitting the carcass in halves, either of the hooks may be unloaded without in any way affecting the other hook or its load comprising the other half of the carcass,—as distinct from those appliances having the hooks so connected as to be affected by the release of the load on either of the same.

It will thus be apparent that I have devised a practical and efficient construction for carrying out the desired objects of the invention, and that the improved gambrel hook and hoisting apparatus is adapted to be made in any appropriate dimensions according to the size of the animal to be operated upon, and while I have illustrated and described what I now regard as the preferred form of embodiment of the invention I desire to reserve the right to make all such changes as may fairly fall within the scope of the appended claims.

Having thus described my invention, what I claim and desire to secure by Letters Patent is:—

1. A gambrel hook and hoisting apparatus comprising a set of three supporting legs all pivotally connected at their upper ends, and a gambrel hook secured to the outer side of each of the outer pair of said legs.

2. A gambrel hook and hoisting apparatus comprising a set of supporting legs, a gambrel hook secured to the outer side of each of a pair of said legs, and means pivotally connecting the upper ends of all of said legs and permitting limited lateral outward spreading movement of the legs carrying said hooks.

3. A gambrel hook and hoisting apparatus comprising a set of three supporting legs provided at their upper ends with pivotal connecting means permitting relative swinging movement of the legs about a common horizontal axis, a gambrel hook secured to the outer side of each of the outer legs of said set, said pivotal connecting means being also adapted to permit limited outward spreading movement of said outer legs.

4. A gambrel hoist comprising a set of three supporting legs, a pivot bolt connecting the upper ends of all of said legs and permitting relative swinging movement thereof about a common horizontal axis, a pair of gambrel hooks projecting outwardly and upwardly from the outer legs near their upper ends, said pivotal bolt having limited loose play in the upper ends of said outer legs, whereby the latter may have limited spreading movement, and said inner leg may be operated to hoist the load on said hooks.

In witness whereof I hereunto affix my signature.

FRANK F. FETTER.